UNITED STATES PATENT OFFICE 2,285,340

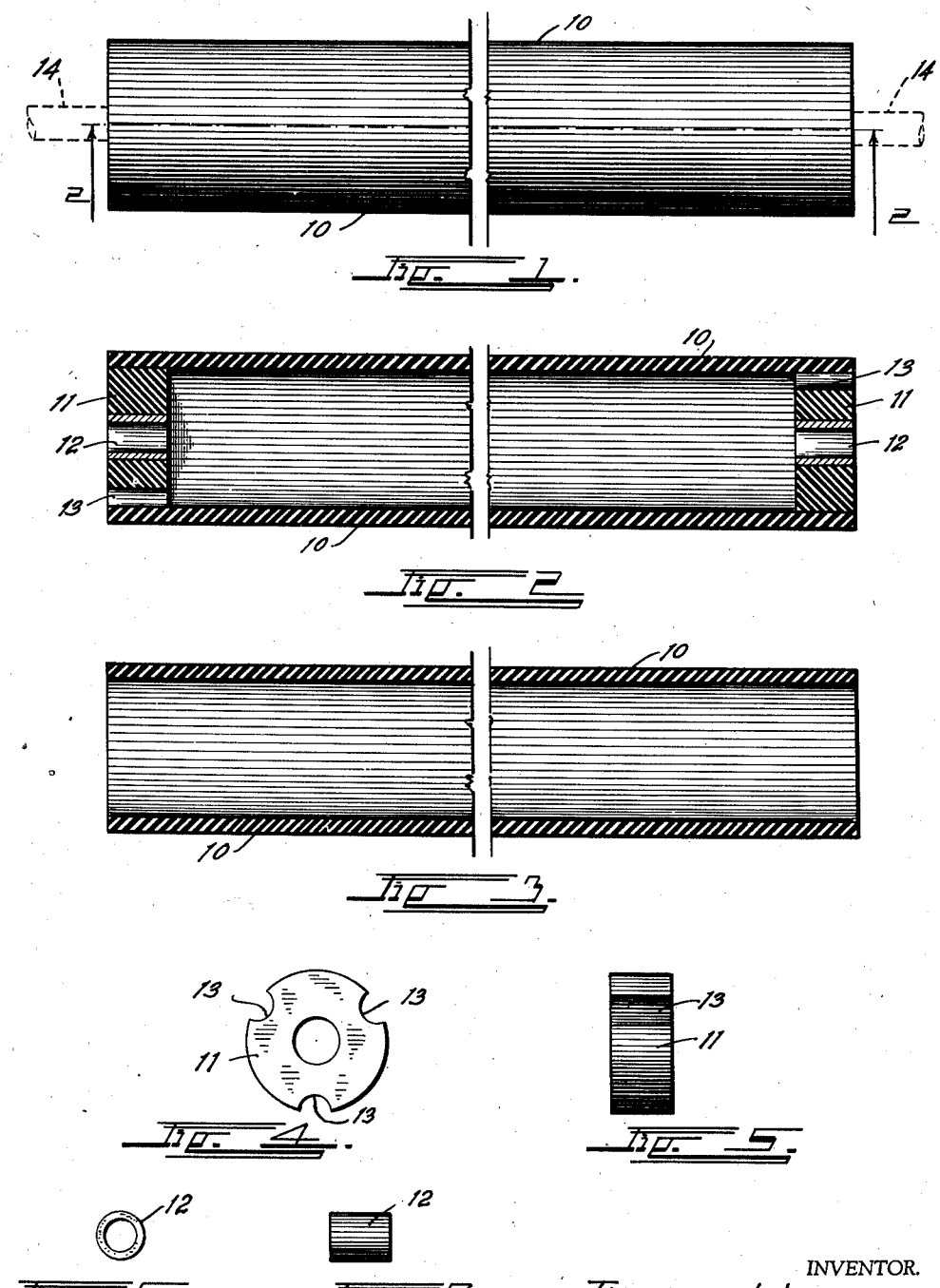

POTATO WASHER ROLLER

Thorval J. Lockwood, Gering, Nebr.

Application January 13, 1941, Serial No. 374,149

1 Claim. (Cl. 146—194)

This invention relates to a roller construction and more particularly to the type of roller such as used for conveying potatoes through potato washing machines which must operate constantly submerged in water and solution.

The principal object of the invention is to provide a construction which will not be damaged by long submersion and which can be quickly assembled from simple parts in any desired lengths.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer in like parts in all views of the drawing and throughout the description.

In the drawing:

Fig. 1 is a side view of the improved roller;

Fig. 2 is a longitudinal section therethrough, taken on the line 2—2, Fig. 1;

Fig. 3 is a longitudinal section through the outer cylinder of the roller;

Fig. 4 is a face view of the end plug of the roller;

Fig. 5 is a side view of the end plug; and

Figs. 6 and 7 are front and side views, respectively, of the plug bushing.

The improved roller consists of three parts; an outer cylinder 10, and end plug 11, and a bushing 12.

The outer cylinder is a simple tube of any desired length and diameter and is preferably moulded from relatively thick heavy tire tread-stock rubber.

The end plugs 11 are also preferably moulded from heavy tire tread-stock rubber. The plugs are of a diameter which allows them to be forced into the outer cylinder 10 to frictionally engage the inner walls thereof. The plugs are provided with a plurality of drain grooves 13 in their peripheries to allow solution to enter and drain from the tube 10.

The rollers are designed to be supported upon suitable axles, such as indicated in broken line at 14, and which pass through the bearing bushings 12 in the end plugs 11. The bearing bushings are preferably formed from bronze or other non-corrosive bearing metal and are of a diameter to allow them to be forced into the end plug to be frictionally held in place therein.

For exceedingly long rollers, additional end plugs may be placed within the roller to prevent collapse of the outer tube. These plugs may, if desired, be cemented to the outer tube although this is not usually necessary.

To manufacture a roller, the mechanic saws or cuts a piece of rubber tubing the desired length of a roller, forces the two end plugs in place therein and then forces the bearing bushings into the plugs and the roller is completed without additional labor.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

A roller comprising: a cylindrical tube of resilient rubber; a circular end plug forced into each extremity of said tube to frictionally engage the inner walls thereof; and a metallic bearing bushing axially positioned within each end plug, there being grooves formed in the peripheries of the end plugs to provide drainage from the interior of the roller.

THORVAL J. LOCKWOOD.